(12) United States Patent
Park et al.

(10) Patent No.: US 7,778,460 B2
(45) Date of Patent: Aug. 17, 2010

(54) APPARATUS FOR COMPENSATING FOR GRAY COMPONENT OF IMAGE SIGNAL

(75) Inventors: Yong-cheol Park, Yongin-si (KR); Min-woo Nho, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 1046 days.

(21) Appl. No.: 11/272,246

(22) Filed: Nov. 10, 2005

(65) Prior Publication Data

US 2006/0104509 A1    May 18, 2006

(30) Foreign Application Priority Data

Nov. 12, 2004    (KR) ..................... 10-2004-0092332

(51) Int. Cl.
*G06K 9/00* (2006.01)
*G06K 9/34* (2006.01)

(52) U.S. Cl. ...................................... 382/167; 382/173
(58) Field of Classification Search ................ 382/167, 382/173
See application file for complete search history.

(56) References Cited

U.S. PATENT DOCUMENTS

| | | | |
|---|---|---|---|
| 5,134,666 A * | 7/1992 | Imao et al. ................... | 382/164 |
| 5,596,655 A * | 1/1997 | Lopez ......................... | 382/173 |
| 5,911,004 A * | 6/1999 | Ohuchi et al. ................ | 382/173 |
| 6,240,203 B1 * | 5/2001 | Kawano et al. .............. | 382/164 |
| 6,473,202 B1 * | 10/2002 | Kanata et al. ................ | 358/2.1 |
| 6,487,309 B1 * | 11/2002 | Chen ........................... | 382/162 |
| 6,631,210 B1 * | 10/2003 | Mutoh et al. ................. | 382/176 |
| 7,102,696 B2 | 9/2006 | Kao et al. | |
| 2002/0167467 A1 | 11/2002 | Kao et al. | |
| 2002/0176024 A1 | 11/2002 | Kao et al. | |
| 2004/0120575 A1 * | 6/2004 | Cheng ......................... | 382/167 |

FOREIGN PATENT DOCUMENTS

| | | | |
|---|---|---|---|
| JP | 02162967 A | * | 6/1990 |
| JP | 07-184075 | | 7/1995 |
| JP | 2000152021 A | * | 5/2000 |
| JP | 2003-087807 | | 3/2003 |
| KR | 1997-0014243 | | 3/1997 |
| KR | 2002-0089876 | | 11/2002 |
| KR | 2003-0063221 | | 7/2003 |
| TW | 281357 | | 7/1996 |
| TW | 514950 | | 12/2002 |
| TW | 583870 | | 4/2004 |

OTHER PUBLICATIONS

Preliminary Notice of First Office Action issued Jun. 17, 2009 in corresponding Taiwan Application No. 094136834.

* cited by examiner

*Primary Examiner*—Bhavesh M Mehta
*Assistant Examiner*—Bernard Krasnic
(74) *Attorney, Agent, or Firm*—Mills & Onello, LLP (57) ABSTRACT

Provided is an apparatus for compensating for a gray component of an input image signal. The apparatus detects a pattern of the input image signal and compensates for the gray component by substituting each channel value of the input image signal by a median value if it is determined that the input image signal is gray pattern. Accordingly, a problem of displaying a color component due to distortion of a gray component of an input image signal can be resolved by resolving a color recognition problem of a gray signal generated by channel differences of the input image signal due to noise induced by a display system, which receives an output of an ADC, or external influences.

29 Claims, 3 Drawing Sheets

100
APPARATUS FOR COMPENSATING FOR GRAY COMPONENT OF IMAGE SIGNAL

BACKGROUND OF THE INVENTION

This application claims the priority of Korean Patent Application No. 2004-0092332, filed on Nov. 12, 2004, in the Korean Intellectual Property Office, the contents of which are incorporated herein in their entirety by reference.

1. Field of the Invention

The present invention relates to an image display device, and more particularly, to image processing and color compensating technologies used for an image display device.

2. Description of the Related Art

A graphic card or an image signal transmitter outputs an image signal as a digital signal or an analog signal. If the output signal is an analog signal such as an RGB image signal, it may be necessary for a display device to convert the input analog image signal to a digital image signal. If necessary, an image processor of the display device includes an analog-to-digital converter (ADC).

However, in this case, an image quality characteristic of the display device is affected due to the ADC color linearity. That is, a color component of the input image signal can be distorted by noise due to a cable or external influences, thereby making a viewer feel uncomfortable. Additionally, if a gray component of the input image signal is distorted, the color component is mixed with the gray component, which makes the viewer feel even more uncomfortable.

Therefore, in this case, it is necessary to fully compensate for the distorted gray component. However, if only the color component is distorted, it is not necessary to compensate for the distorted color component, or it is sufficient only if a color tone is slightly compensated for.

In particular, for a specific effect of the image signal, only a brightness component may be displayed without the color component. For example, the image signal may be converted to a black and white still image or a black and white moving image, and only a specific color tone of the image signal may be displayed. In this case, since a weight of the gray component is high in the image signal, it is necessary to compensate more for the color tone.

SUMMARY OF THE INVENTION

The present invention provides an apparatus for resolving a color recognition problem of a gray signal, generated by channel differences of an input RGB signal or a chrominance YCbCr signal due to external noise in a display system using an output from an analog-to-digital converter (ADC).

The present invention also provides an apparatus for determining whether ADC RGB data is a gray pattern and minimizing mismatches of the ADC RGB data if the ADC RGB data is the gray pattern, in order to minimize degradation of image quality due to ADC color linearity.

According to an aspect of the present invention, there is provided an apparatus for detecting a color tone pattern of an input image signal, the apparatus comprising: a pattern detector outputting a pattern detection signal by comparing a difference between image signal values of each of a plurality of pixels with a predetermined comparison value in an activated area of one frame of the input image signal or a predetermined area of the activated area, wherein if a maximum difference between image signal values of each pixel is less than the predetermined comparison value, the pattern detector outputs a pattern detection signal indicating that the image signal is a gray pattern, and if the maximum difference between the image signal values of each pixel is greater than the predetermined comparison value, the pattern detector outputs a pattern detection signal indicating that the image signal is a color pattern.

According to another aspect of the present invention, there is provided an apparatus for compensating for a gray component of an input image signal, the apparatus comprising: a color tone pattern detector comparing a difference between image signal values of each of a plurality of pixels with a predetermined comparison value in an activated area of one frame of the input image signal or a predetermined area of the activated area and outputting the difference value and a pattern detection signal; and an RGB compensator compensating for the gray component of the input image signal in response to the pattern detection signal output from the color tone pattern detector.

In one embodiment, the pattern detector outputs a pattern detection signal indicating that the image signal is a gray pattern if a maximum difference between image signal values of each pixel is less than the predetermined comparison value and outputs a pattern detection signal indicating that the image signal is a color pattern if the maximum difference between the image signal values of each pixel is greater than the predetermined comparison value. The RGB compensator adaptively compensates for the input image signal based on the difference value according to a color tone pattern of the input image signal.

The color tone pattern detector may comprise: a first color tone pattern detector outputting a first pattern detection signal by comparing a difference between image signal values of each pixel with a predetermined comparison value in an activated area of one frame of the input image signal or a predetermined area of the activated area; a second color tone pattern detector outputting a second pattern detection signal by comparing a difference between image signal values of neighboring pixels with a predetermined comparison value in the activated area of the frame of the input image signal or the predetermined area of the activated area; and a third color tone pattern detector receiving the first and second pattern detection signals and performing an AND operation on the two signals, wherein the first color tone pattern detector outputs a first pattern detection signal indicating that the image signal is a gray pattern if a maximum difference between image signal values of each pixel is less than the predetermined comparison value and outputs a pattern detection signal indicating that the image signal is a color pattern if the maximum difference between the image signal values of each pixel is greater than the predetermined comparison value. The second color tone pattern detector outputs a second pattern detection signal indicating that the image signal is the gray pattern if a maximum difference between the image signal values of the neighboring pixels is less than the predetermined comparison value and outputs a second pattern detection signal indicating that the image signal is the color pattern if the maximum difference between the image signal values of the neighboring pixels is greater than the predetermined comparison value. The third color tone pattern detector outputs a pattern detection signal indicating that the image signal is the gray pattern if the first and second pattern detection signals indicating that the image signal is the gray pattern are input from the first and second color tone pattern detectors and outputs a pattern detection signal indicating that the image signal is the color pattern if the first or second pattern detection signal indicating that the image signal is the color pattern is input from the first or second color tone pattern detectors. The image signal may be an RGB image signal.

In one embodiment, the apparatus further comprises a reference value setting unit comprising: a first output unit outputting a first reference value when the pattern detection signal indicates the gray pattern and outputting a second reference value when the pattern detection signal indicates the color pattern; a second output unit outputting a third reference value when the pattern detection signal indicates the gray pattern and outputting a fourth reference value when the pattern detection signal indicates the color pattern; and an adder adding an output value of the first output unit to an output value of the second output unit.

The gray component compensation apparatus may further comprise an image signal transformer transforming a format of the input image signal and outputting the transformed image signal to the first and second color tone pattern detectors, wherein the input image signal is an RGB, YCbCr, or YPbPr image signal, and the image signal transformed by the image signal transformer is an RGB image signal.

The first color tone pattern detector may obtain R−G, G−B, and B−R values using R, G, and B values of each pixel, and if all absolute values of the R−G, G−B, and B−R values are less than the predetermined comparison value, the first color tone pattern detector may output a pattern detection signal indicating that the image signal is the gray pattern.

The second color tone pattern detector may obtain absolute values of $(R_n-G_n)-(R_{n+1}-G_{n+1})$, $(G_n-B_n)-(G_{n+1}-B_{n+1})$, and $(B_n-R_n)-(B_{n+1}-R_{n+1})$ values using $R_n$, $G_n$, $B_n$, $R_{n+1}$, $G_{n+1}$, and $B_{n+1}$ values of neighboring pixels, and if all of the obtained absolute values are less than the predetermined comparison value, the second color tone pattern detector may output the second pattern detection signal indicating that the image signal is the gray pattern, wherein the $R_n$, $G_n$, and $B_n$ values are RGB values of a certain pixel, and the $R_{n+1}$, $G_{n+1}$, and $B_{n+1}$ values are RGB values of a neighboring pixel of the pixel.

In one embodiment, the RGB compensator: (i) compensates for the image signal into the gray component using a median value of the RGB values if a difference between the RGB values of the image signal is less than an output value of the first output unit, (ii) compensates for the image signal by a little amount using approximate median values of the RGB values if the difference between the RGB values of the image signal is greater than the output value of the first output unit and less than an output value of the adder, and (iii) does not compensate for a tone color of the image signal if the difference of the RGB values of the image signal is greater than the output value of the adder.

In one embodiment, the RGB compensator (i) substitutes the RGB values of the image signal by a median value if a maximum difference between the RGB values of the image signal is less than an output value of the first output unit, (ii) substitutes an R component of the RGB image signal by the median value if the difference between the RGB values of the image signal is greater than the output value of the first output unit and less than an output value of the adder and if a difference between the median value of the RGB values and the R component value is less than the output value of the first output unit, (iii) substitutes a G component of the RGB image signal by the median value if the difference between the RGB values of the image signal is greater than the output value of the first output unit and less than the output value of the adder and if a difference between the median value of the RGB values and the G component value is less than the output value of the first output unit, (iv) substitutes a B component of the RGB image signal by the median value if the difference between the RGB values of the image signal is greater than the output value of the first output unit and less than the output value of the adder and if a difference between the median value of the RGB values and the B component value is less than the output value of the first output unit, (v) substitutes the R component of the RGB image signal by $R_{out}=R_{in}-\{(R_{in}-\text{Median})*|R_{in}-\text{Median}|\}/(\text{VCL}+\text{VDAMP})$ if the difference between the RGB values of the image signal is greater than the output value of the first output unit and less than the output value of the adder and if the difference between the median value of the RGB values and the R component value is greater than the output value of the first output unit, (vi) substitutes the G component of the RGB image signal by $G_{out}=G_{in}-\{(G_{in}-\text{Median})*|G_{in}-\text{Median}|\}/(\text{VCL}+\text{VDAMP})$ if the difference between the RGB values of the image signal is greater than the output value of the first output unit and less than the output value of the adder and if the difference between the median value of the RGB values and the G component value is greater than the output value of the first output unit, (vii) substitutes the B component of the RGB image signal by $B_{out}=B_{in}-\{(B_{in}-\text{Median})*|B_{in}-\text{Median}|\}/(\text{VCL}+\text{VDAMP})$ if the difference between the RGB values of the image signal is greater than the output value of the first output unit and less than the output value of the adder and if the difference between the median value of the RGB values and the B component value is greater than the output value of the first output unit, wherein $R_{out}$, $G_{out}$, and $B_{out}$ are the substituted RGB values, $R_{in}$, $G_{in}$, and $B_{in}$ are the RGB values of the input image signal, Median denotes the median value of $R_{in}$, $G_{in}$, and $B_{in}$, and VCL+VDAMP denotes the output value of the adder, and (viii) does not compensate the color tone of the image signal if the difference between the RGB values of the image signal is greater than the output value of the adder.

According to another aspect, the invention is directed to an apparatus for detecting a color tone pattern of an input image signal, the apparatus comprising: a first color tone pattern detector comparing a difference between image signal values of each of a plurality of pixels with a predetermined comparison value in an activated area of one frame of the input image signal or a predetermined area of the activated area and outputting the difference value and a first pattern detection signal; a second color tone pattern detector outputting a second pattern detection signal by comparing a difference between image signal values of neighboring pixels with the predetermined comparison value in the activated area of the frame of the input image signal or the predetermined area of the activated area; and a third color tone pattern detector receiving the first and second pattern detection signals and performing an AND operation on the two signals. The first color tone pattern detector outputs a first pattern detection signal indicating that the image signal is a gray pattern if a maximum difference between the image signal values of each pixel is less than the predetermined comparison value and outputs a pattern detection signal indicating that the image signal is a color pattern if the maximum difference between the image signal values of each pixel is greater than the predetermined comparison value. The second color tone pattern detector outputs a second pattern detection signal indicating that the image signal is the gray pattern if a maximum difference between the image signal values of the neighboring pixels is less than the predetermined comparison value and outputs a second pattern detection signal indicating that the image signal is the color pattern if the maximum difference between the image signal values of the neighboring pixels is greater than the predetermined comparison value. The third color tone pattern detector outputs a pattern detection signal indicating that the image signal is the gray pattern if the first and second pattern detection signals indicating that the image signal is the gray pattern are input from the first and second color tone pattern detectors and outputs a pattern detection signal indicating that the image signal is the color pattern if the first or second pattern detection signal indicating that the image signal is the color pattern is input from the first or second color tone pattern detectors.

In one embodiment, the image signal is an RGB image signal.

In one embodiment, the apparatus further comprises an image signal transformer transforming a format of the input image signal and outputting the transformed image signal to the first and second color tone pattern detectors. The input image signal is one of RGB, YCbCr, and YPbPr image signals, and the image signal transformed by the image signal transformer is an RGB image signal.

In one embodiment, the first color tone pattern detector obtains R–G, G–B, and B–R values using R, G, and B values of each pixel, and if all absolute values of the R–G, G–B, and B–R values are less than the predetermined comparison value, the first color tone pattern detector outputs a pattern detection signal indicating that the image signal is the gray pattern.

In one embodiment, the second color tone pattern detector obtains absolute values of $(R_n-G_n)-(R_{n+1}-G_{n+1})$, $(G_n-B_n)-(G_{n+1}-B_{n+1})$, and $(B_n-R_n)-(B_{n+1}-R_{n+1})$ values using $R_n$, $G_n$, $B_n$, $R_{n+1}$, $G_{n+1}$, and $B_{n+1}$ values of neighboring pixels, and if all of the obtained absolute values are less than the predetermined comparison value, the second color tone pattern detector outputs the second pattern detection signal indicating that the image signal is the gray pattern, wherein the $R_n$, $G_n$, and $B_n$ values are RGB values of a certain pixel, and the $R_{n+1}$, $G_{n+1}$, and $B_{n+1}$ values are RGB values of a neighboring pixel of the pixel.

According to another aspect of the present invention, there is provided an apparatus for compensating for a gray component of an input image signal, the apparatus comprising: a first color tone pattern detector comparing a difference between image signal values of each of a plurality of pixels with a predetermined comparison value in an activated area of one frame of the input image signal or a predetermined area of the activated area and outputting the difference value and a first pattern detection signal; a second color tone pattern detector outputting a second pattern detection signal by comparing a difference between image signal values of neighboring pixels with the predetermined comparison value in the activated area of the frame of the input image signal or the predetermined area of the activated area; a third color tone pattern detector receiving the first and second pattern detection signals and performing an AND operation on the two signals; and an RGB compensator compensating for the gray component of the input image signal in response to an output signal from the third color tone pattern detector. The first color tone pattern detector outputs a first pattern detection signal indicating that the image signal is a gray pattern if a maximum difference between the image signal values of each pixel is less than the predetermined comparison value and outputs a pattern detection signal indicating that the image signal is a color pattern if the maximum difference between the image signal values of each pixel is greater than the predetermined comparison value. The second color tone pattern detector outputs a second pattern detection signal indicating that the image signal is the gray pattern if a maximum difference between the image signal values of the neighboring pixels is less than the predetermined comparison value and outputs a second pattern detection signal indicating that the image signal is the color pattern if the maximum difference between the image signal values of the neighboring pixels is greater than the predetermined comparison value. The third color tone pattern detector outputs a pattern detection signal indicating that the image signal is the gray pattern if the first and second pattern detection signals indicating that the image signal is the gray pattern are input from the first and second color tone pattern detectors and outputs a pattern detection signal indicating that the image signal is the color pattern if the first or second pattern detection signal indicating that the image signal is the color pattern is input from the first or second color tone pattern detectors. The RGB compensator does not compensate for a color tone if it is determined that the input image signal is the color pattern, compensates for the color tone by a small amount based on the difference value if it is determined that the input image signal is a pseudo gray pattern, and compensates for the image signal into the gray component based on the difference value if it is determined that the input image signal is the gray pattern.

The gray component compensation apparatus may further comprise a reference value setting unit comprising: a first output unit outputting a first reference value when the pattern detection signal indicates that the image signal is the gray pattern and outputting a second reference value when the pattern detection signal indicates that the image signal is the color pattern; a second output unit outputting a third reference value when the pattern detection signal indicates that the image signal is the gray pattern and outputting a fourth reference value when the pattern detection signal indicates that the image signal is the color pattern; and an adder adding an output value output from the first output unit to an output value output from the second output unit.

The first color tone pattern detector may obtain R–G, G–B, and B–R values using R, G, and B values of each pixel, and if all absolute values of the R–G, G–B, and B–R values are less than the predetermined comparison value, the first color tone pattern detector may output a pattern detection signal indicating that the image signal is the gray pattern. The second color tone pattern detector may obtain absolute values of $(R_n-G_n)-(R_{n+1}-G_{n+1})$, $(G_n-B_n)-(G_{n+1}-B_{n+1})$, and $(B_n-R_n)-(B_{n+1}-R_{n+1})$ values using $R_n$, $G_n$, $B_n$, $R_{n+1}$, $G_{n+1}$, and $B_{n+1}$ values of neighboring pixels, and if all of the obtained absolute values are less than the predetermined comparison value, the second color tone pattern detector may output the second pattern detection signal indicating that the image signal is the gray pattern, wherein the $R_n$, $G_n$, and $B_n$ values are RGB values of a certain pixel, and the $R_{n+1}$, $G_{n+1}$, and $B_{n+1}$ values are RGB values of a neighboring pixel of the pixel.

The RGB compensator may compensate for the image signal into the gray component using a median value of the RGB values if a difference between the RGB values of the image signal is less than an output value of the first output unit, compensates for the image signal by a small amount using approximate median values of the RGB values if the difference between the RGB values of the image signal is greater than the output value of the first output unit and less than an output value of the adder, and does not compensate for a tone color of the image signal if the difference of the RGB values of the image signal is greater than the output value of the adder.

The RGB compensator may: (i) substitute the RGB values of the image signal by a median value if a maximum difference between the RGB values of the image signal is less than an output value of the first output unit, (ii) substitute an R component of the RGB image signal by the median value if the difference between the RGB values of the image signal is greater than the output value of the first output unit and less than an output value of the adder and if a difference between the median value of the RGB values and the R component value is less than the output value of the first output unit, (iii)

substitute a G component of the RGB image signal by the median value if the difference between the RGB values of the image signal is greater than the output value of the first output unit and less than the output value of the adder and if a difference between the median value of the RGB values and the G component value is less than the output value of the first output unit, (iv) substitute a B component of the RGB image signal by the median value if the difference between the RGB values of the image signal is greater than the output value of the first output unit and less than the output value of the adder and if a difference between the median value of the RGB values and the B component value is less than the output value of the first output unit, (v) substitute the R component of the RGB image signal by $R_{out}=R_{in}-\{(R_{in}-Median)*|R_{in}-Median|\}/(VCL+VDAMP)$ if the difference between the RGB values of the image signal is greater than the output value of the first output unit and less than the output value of the adder and if the difference between the median value of the RGB values and the R component value is greater than the output value of the first output unit, (vi) substitute the G component of the RGB image signal by $G_{out}=G_{in}-\{(G_{in}-Median)*|G_{in}-Median|\}/(VCL+VDAMP)$ if the difference between the RGB values of the image signal is greater than the output value of the first output unit and less than the output value of the adder and if the difference between the median value of the RGB values and the G component value is greater than the output value of the first output unit, (vii) substitute the B component of the RGB image signal by $B_{out}=B_{in}-\{(B_{in}-Median)*|B_{in}-Median|\}/(VCL+VDAMP)$ if the difference between the RGB values of the image signal is greater than the output value of the first output unit and less than the output value of the adder and if the difference between the median value of the RGB values and the B component value is greater than the output value of the first output unit, wherein $R_{out}$, $G_{out}$, and $B_{out}$ are the substituted RGB values, $R_{in}$, $G_{in}$, and $B_{in}$ are the RGB values of the input image signal, Median denotes the median value of $R_{in}$, $G_{in}$, and $B_{in}$, and VCL+VDAMP denotes the output value of the adder, and (viii) does not compensate the color tone of the image signal if the difference between the RGB values of the image signal is greater than the output value of the adder.

The first reference value may be greater than the second reference value, and the third reference value may be greater than the fourth reference value. According to another aspect, the invention is directed to an apparatus for compensating for a gray component of an input image signal, the apparatus comprising: a first color tone pattern detector comparing a difference between image signal values of each of a plurality of pixels with a predetermined comparison value in an activated area of one frame of the input image signal or a predetermined area of the activated area and outputting the difference value and a first pattern detection signal; a second color tone pattern detector outputting a second pattern detection signal by comparing a difference between image signal values of neighboring pixels with the predetermined comparison value in the activated area of the frame of the input image signal or the predetermined area of the activated area; a third color tone pattern detector receiving the first and second pattern detection signals and performing an AND operation on the two signals; and an RGB compensator compensating for the gray component of the input image signal in response to an output signal from the third color tone pattern detector. The first color tone pattern detector outputs a first pattern detection signal indicating that the image signal is a gray pattern if a maximum difference between the image signal values of each pixel is less than the predetermined comparison value and outputs a pattern detection signal indicating that the image signal is a color pattern if the maximum difference between the image signal values of each pixel is greater than the predetermined comparison value. The second color tone pattern detector outputs a second pattern detection signal indicating that the image signal is the gray pattern if a maximum difference between the image signal values of the neighboring pixels is less than the predetermined comparison value and outputs a second pattern detection signal indicating that the image signal is the color pattern if the maximum difference between the image signal values of the neighboring pixels is greater than the predetermined comparison value. The third color tone pattern detector outputs a pattern detection signal indicating that the image signal is the gray pattern if the first and second pattern detection signals indicating that the image signal is the gray pattern are input from the first and second color tone pattern detectors and outputs a pattern detection signal indicating that the image signal is the color pattern if the first or second pattern detection signal indicating that the image signal is the color pattern is input from the first or second color tone pattern detectors. The RGB compensator does not compensate for a color tone if it is determined that the input image signal is the color pattern, compensates for the color tone by a little amount based on the difference value if it is determined that the input image signal is a pseudo gray pattern, and compensates for the image signal into the gray component based on the difference value if it is determined that the input image signal is the gray pattern.

In one embodiment, the apparatus of the invention further includes a reference value setting unit comprising: a first output unit outputting a first reference value when the pattern detection signal indicates the gray pattern and outputting a second reference value when the pattern detection signal indicates the color pattern; a second output unit outputting a third reference value when the pattern detection signal indicates the gray pattern and outputting a fourth reference value when the pattern detection signal indicates the color pattern; and an adder adding an output value of the first output unit to an output value of the second output unit.

In one embodiment, the first color tone pattern detector obtains R–G, G–B, and B–R values using R, G, and B values of each pixel, and if all absolute values of the R–G, G–B, and B–R values are less than the predetermined comparison value, the first color tone pattern detector outputs a pattern detection signal indicating that the image signal is the gray pattern; the second color tone pattern detector obtains absolute values of $(R_n-G_n)-(R_{n+1}-G_{n+1})$, $(G_n-B_n)-(G_{n+1}-B_{n+1})$, and $(B_n-R_n)-(B_{n+1}-R_{n+1})$ values using $R_n$, $G_n$, $B_n$, $R_{n+1}$, $G_{n+1}$, and $B_{n+1}$ values of neighboring pixels, and if all of the obtained absolute values are less than the predetermined comparison value, the second color tone pattern detector outputs the second pattern detection signal indicating that the image signal is the gray pattern; wherein the $R_n$, $G_n$, and $B_n$ values are RGB values of a certain pixel, and the $R_{n+1}$, $G_{n+1}$, and $B_{n+1}$ values are RGB values of a neighboring pixel of the pixel.

In one embodiment, the RGB compensator compensates for the image signal into the gray component using a median value of the RGB values if a difference between the RGB values of the image signal is less than an output value of the first output unit, compensates for the image signal by a little amount using approximate median values of the RGB values if the difference between the RGB values of the image signal is greater than the output value of the first output unit and less than an output value of the adder, and does not compensate for a tone color of the image signal if the difference of the RGB values of the image signal is greater than the output value of the adder.

In one embodiment, the RGB compensator: (i) substitutes the RGB values of the image signal by a median value if a maximum difference between the RGB values of the image signal is less than an output value of the first output unit, (ii) substitutes an R component of the RGB image signal by the median value if the difference between the RGB values of the image signal is greater than the output value of the first output unit and less than an output value of the adder and if a difference between the median value of the RGB values and the R component value is less than the output value of the first output unit, (iii) substitutes a G component of the RGB image signal by the median value if the difference between the RGB values of the image signal is greater than the output value of the first output unit and less than the output value of the adder and if a difference between the median value of the RGB values and the G component value is less than the output value of the first output unit, (iv) substitutes a B component of the RGB image signal by the median value if the difference between the RGB values of the image signal is greater than the output value of the first output unit and less than the output value of the adder and if a difference between the median value of the RGB values and the B component value is less than the output value of the first output unit, (v) substitutes the R component of the RGB image signal by $R_{out}=R_{in}-\{(R_{in}-Median)*|R_{in}-Median|\}/(VCL+VDAMP)$ if the difference between the RGB values of the image signal is greater than the output value of the first output unit and less than the output value of the adder and if the difference between the median value of the RGB values and the R component value is greater than the output value of the first output unit, (vi) substitutes the G component of the RGB image signal by $G_{out}=G_{in}-\{(G_{in}-Median)*|G_{in}-Median|\}/(VCL+VDAMP)$ if the difference between the RGB values of the image signal is greater than the output value of the first output unit and less than the output value of the adder and if the difference between the median value of the RGB values and the G component value is greater than the output value of the first output unit, (vii) substitutes the B component of the RGB image signal by $B_{out}=B_{in}-\{(B_{in}-Median)*|B_{in}-Median|\}/(VCL+VDAMP)$ if the difference between the RGB values of the image signal is greater than the output value of the first output unit and less than the output value of the adder and if the difference between the median value of the RGB values and the B component value is greater than the output value of the first output unit, wherein $R_{out}$, $G_{out}$, and $B_{out}$ are the substituted RGB values, $R_{in}$, $G_{in}$, and $B_{in}$ are the RGB values of the input image signal, Median denotes the median value of $R_{in}$, $G_{in}$, and $B_{in}$, and VCL+VDAMP denotes the output value of the adder, and (viii) does not compensate the color tone of the image signal if the difference between the RGB values of the image signal is greater than the output value of the adder.

In one embodiment, the first reference value is greater than the second reference value, and the third reference value is greater than the fourth reference value.

BRIEF DESCRIPTION OF THE DRAWINGS

The foregoing and other objects, features and advantages of the invention will be apparent from the more particular description of preferred aspects of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS OF THE INVENTION

If channel differences are generated on input image data by noise due to a cable or external influences, the present invention detects a pattern of an image signal from an output of an analog-to-digital converter (ADC) or external input data, and if it is determined that the image signal is a gray component, the present invention removes distortion of the image signal or the external data by compensating for a color tone and converts the image signal to a gray image.

Figure 1:
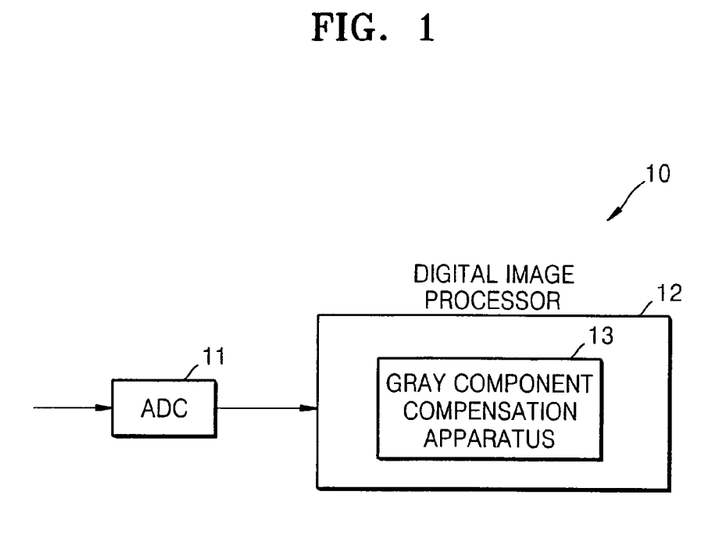
FIG. 1 is a block diagram of an image processing system using a gray component compensation apparatus according to an embodiment of the present invention.

FIG. 1 is a block diagram of an image processing system 10 using a gray component compensation apparatus according to an embodiment of the present invention.

Referring to FIG. 1, the image processing system 10 includes an ADC 11 and a digital image processor 12. Also, the digital image processor 12 includes a gray component compensation apparatus 13 according to the present embodiment.

The ADC 11 converts an input analog image signal to a digital image signal for digital processing and display, and the digital image processor 12 performs various image processing functions such as digital image compensation and scale conversion. The gray component compensation apparatus 13 detects a color tone pattern of an input digital image signal and adaptively compensates for the input RGB image signal based on the detected color tone pattern.

That is, in the digital image processor 12 receiving an output of the ADC 11, when a color signal is detected due to mismatches of "RED," "GREEN," and "BLUE" channels even though an original analog signal is a gray signal, the gray component compensation apparatus 13 compensates for the input signal so as to have only a gray component if it is determined that the input signal is a gray pattern.

Since the gray component compensation apparatus 13 changes RGB values of an image signal, if input digital data is not an RGB signal, the gray component compensation apparatus 13 can further include an image signal transformer (not shown) for transforming an image signal to an RGB format.

That is, a format of an image signal input to the image processing system 10 may be an RGB, YCbCr, or YPbPr format. Accordingly, for easy compensation of a gray component of the image signal, it is necessary to transform the format of the image signal to the RGB format. Therefore, the image processing system 10 transforms various formats of image signals to the RGB format using the image signal transformer and compensates for the gray component of the image signal.

Figure 2:
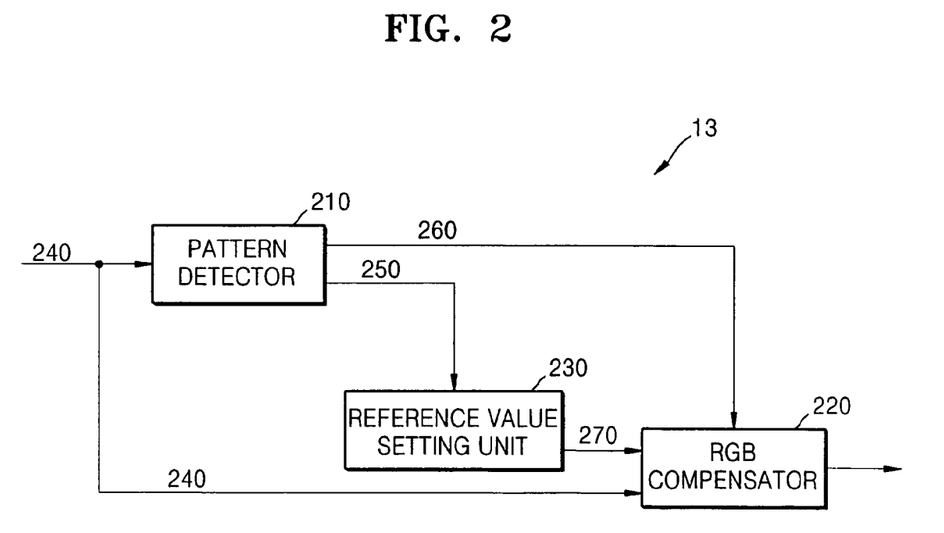
FIG. 2 is a block diagram of the gray component compensation apparatus of FIG. 1.

FIG. 2 is a block diagram of the gray component compensation apparatus 13 of FIG. 1.

Referring to FIG. 2, the gray component compensation apparatus 13 includes a pattern detector 210, an RGB compensator 220, and a reference value setting unit 230.

The pattern detector 210 receives a pre-compensated RGB image signal 240 output from the ADC 11, calculates a difference 260 between RGB image signal values of each pixel and a difference between RGB image signal values of neighboring pixels in an activated area of one frame of the input RGB image signal 240 or a predetermined area of the activated area, and compares the difference value 260 with a predetermined comparison value. If a maximum difference between the RGB image signal values is less than the predetermined comparison value, the pattern detector 210 determines that the RGB image signal 240 is a gray pattern and outputs a pattern detection signal 250 indicating that the RGB image signal 240 is the gray pattern, and if the maximum difference between the RGB image signal values is greater than the predetermined comparison value, the pattern detector 210 determines that the RGB image signal 240 is a color pattern and outputs the pattern detection signal 250 indicating that the RGB image signal 240 is the color pattern.

The RGB compensator 220 receives the difference 260 between RGB image signal values output from the pattern detector 210, a reference value 270 output from the reference value setting unit 230, and the RGB image signal 240 output from the ADC 11 and adaptively compensates for the RGB image signal 240 based on a color tone pattern of the RGB image signal 240. That is, the RGB compensator 220 compares the difference 260 between RGB image signal values with the reference value 270 output from the reference value setting unit 230 and compensates for the RGB image signal 240 based on the comparison results.

The reference value setting unit 230 sets predetermined reference values 270 using a plurality of gray reference values and a plurality of color reference values and outputs the reference value to the RGB compensator 220 in response to the pattern detection signal 250.

Figure 3:
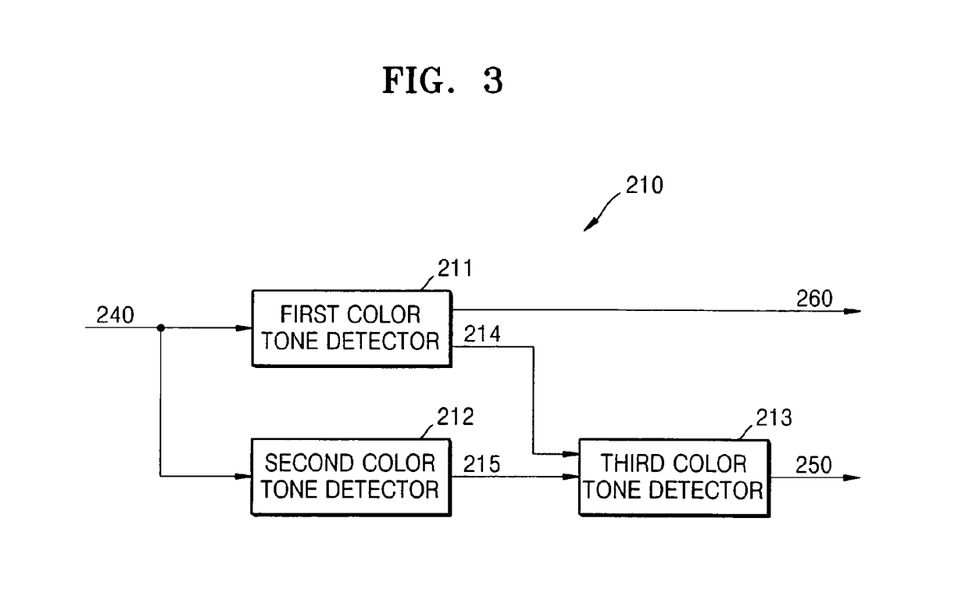
FIG. 3 is a block diagram of a pattern detector of FIG. 2.

FIG. 3 is a block diagram of the pattern detector 210 of FIG. 2.

Referring to FIG. 3, the pattern detector 210 includes a first color tone pattern detector 211, a second color tone pattern detector 212, and a third color tone pattern detector 213.

The first color tone pattern detector 211 outputs a signal by comparing the difference 260 between image signal values of each pixel (hereinafter, RGB difference 260) with a predetermined comparison value in an activated area of one frame of the RGB image signal 240 or a predetermined area of the activated area. Here, if the RGB difference 260 is less than the predetermined comparison value, the first color tone pattern detector 211 outputs a first pattern detection signal 214 indicating that the RGB image signal 240 is the gray pattern, and if the RGB difference 260 is greater than the predetermined comparison value, the first color tone pattern detector 211 outputs the first pattern detection signal 214 indicating that the RGB image signal 240 is the color pattern.

Also, the first color tone pattern detector 211 can output the RGB difference 260.

The first color tone pattern detector 211 obtains differences between the RGB values, i.e., absolute values of R−G, G−B, and B−R values, using RED (R), GREEN (G), and BLUE (B) values of each pixel, and if all of the absolute values of the R−G, G−B, and B−R values are less than the predetermined comparison value, the first color tone pattern detector 211 outputs the first pattern detection signal 214 indicating that the RGB image signal 240 is the gray pattern, and if all of the absolute values of the R−G, G−B, and B−R values are greater than the predetermined comparison value, the first color tone pattern detector 211 outputs the first pattern detection signal 214 indicating that the RGB image signal 240 is the color pattern.

The second color tone pattern detector 212 outputs a signal by comparing a difference between image signal values of neighboring pixels with a predetermined comparison value in the activated area of the frame of the RGB image signal 240 or the predetermined area of the activated area. Here, if the difference between image signal values of neighboring pixels is less than the predetermined comparison value, the second color tone pattern detector 212 outputs a second pattern detection signal 215 indicating that the RGB image signal 240 is the gray pattern, and if the difference between image signal values of neighboring pixels is greater than the predetermined comparison value, the second color tone pattern detector 212 outputs the second pattern detection signal 215 indicating that the RGB image signal 240 is the color pattern.

The second color tone pattern detector 212 obtains absolute values of $(R_n-G_n)-(R_{n+1}-G_{n+1})$, $(G_n-B_n)-(G_{n+1}-B_{n+1})$, and $(B_n-R_n)-(B_{n+1}-R_{n+1})$ values using $R_n$, $G_n$, $B_n$, $R_{n+1}$, $G_{n+1}$, and $B_{n+1}$ values of neighboring pixels, and if all of the obtained absolute values are less than the predetermined comparison value, the second color tone pattern detector 212 outputs the second pattern detection signal 215 indicating that the image signal is the gray pattern, and if all of the obtained absolute values are greater than the predetermined comparison value, the second color tone pattern detector 212 outputs the second pattern detection signal 215 indicating that the image signal is the color pattern. Here, the $R_n$, $G_n$, and $B_n$ values are RGB values of a certain pixel, and the $R_{n+1}$, $G_{n+1}$, and $B_{n+1}$ values are RGB values of a neighboring pixel of the pixel.

The second color tone pattern detector 212 compares the difference between image signal values of neighboring pixels with the predetermined comparison value in order to prevent a determination error where an image of the color pattern is determined as the gray pattern by determining a pattern of just one pixel since in general not only a certain pixel but also a neighboring pixel have the gray pattern when the RGB image signal 240 is the gray pattern.

Therefore, only if both of the first color tone pattern detector 211 and the second color tone pattern detector 212 determine that the RGB image signal 240 is the gray pattern, it is determined that the RGB image signal 240 is the gray pattern. That is, only if it is determined that not only a certain pixel but also a neighboring pixel in one frame are the gray pattern, it is determined that the input RGB image signal 240 is the gray pattern. This final determination is performed by the third color tone pattern detector 213.

The third color tone pattern detector 213 receives the first pattern detection signal 214 and the second pattern detection signal 215 and performs an AND operation on the two signals 214 and 215. If the first and second pattern detection signals 214 and 215 indicating that the RGB image signal 240 is the gray pattern are input from the first and second color tone pattern detectors 211 and 212, the third color tone pattern detector 213 outputs the pattern detection signal 250 indicating that the RGB image signal 240 is the gray pattern, and if the first or second pattern detection signals 214 or 215 indicating that the RGB image signal 240 is the color pattern is input from the first or second color tone pattern detectors 211 or 212, the third color tone pattern detector 213 outputs the pattern detection signal 250 indicating that the RGB image signal 240 is the color pattern.

An AND gate can be simply used for the third color tone pattern detector 213.

An illustrative operation of the pattern detector 210 will now be described with reference to FIG. 3. For example, it is assumed that the comparison value of the first color tone pattern detectors 211 is 5 and the comparison value of the second color tone pattern detectors 212 is 4. If RGB values of a pixel which is determined in a certain frame of the input RGB image signal 240 are 103, 100, and 99, respectively, and if RGB values of a neighboring pixel are 101, 99, and 100, respectively, the first color tone pattern detector 211 calculates 3, 1, and 4 as values of |R−G|, |G−B|, and |B−R|, and since all of the values are less than 5, the first color tone pattern detector 211 outputs the first pattern detection signal 214 indicating that the input RGB image signal 240 is the gray pattern. Also, the second color tone pattern detector 212 calculates 2, 0, and 3 as values of $|(R_n-G_n)-(R_{n+1}-G_{n+1})|$, $|(G_n-B_n)-(G_{n+1}-B_{n+1})|$, and $|(B_n-R_n)-(B_{n+1}-R_{n+1})|$, and since all of the values are less than 4, the second color tone pattern detector 212 outputs the second pattern detection signal 215 indicating that the input RGB image signal 240 is the gray pattern. Accordingly, the third color tone pattern detector 213 outputs the pattern detection signal 250 indicating that the pixel of the input RGB image signal 240 is the gray pattern.

If RGB values of a pixel which is determined in a certain frame of the input RGB image signal 240 are 103, 100, and 98, respectively, and if RGB values of a neighboring pixel are 101, 99, and 100, respectively, the first color tone pattern detectors 211 calculates 3, 2, and 5 as values of |R−G|, |G−B|, and |B−R|, and since a maximum value of the values is 5, the first color tone pattern detector 211 outputs the first pattern detection signal 214 indicating that the input RGB image signal 240 is the color pattern. Also, the second color tone pattern detector 212 calculates 2, 1, and 4 as values of $|(R_n-G_n)-(R_{n+1}-G_{n+1})|$, $|(G_n-B_n)-(G_{n+1}-B_{n+1})|$, and $|(B_n-R_n)-(B_{n+1}-R_{n+1})|$, and since a maximum value of the values is 4, the second color tone pattern detector 212 outputs the second pattern detection signal 215 indicating that the input RGB image signal 240 is the color pattern. Accordingly, the third color tone pattern detector 213 the pattern detection signal 250 indicating that the pixel of the input RGB image signal 240 is the color pattern.

Figure 4:
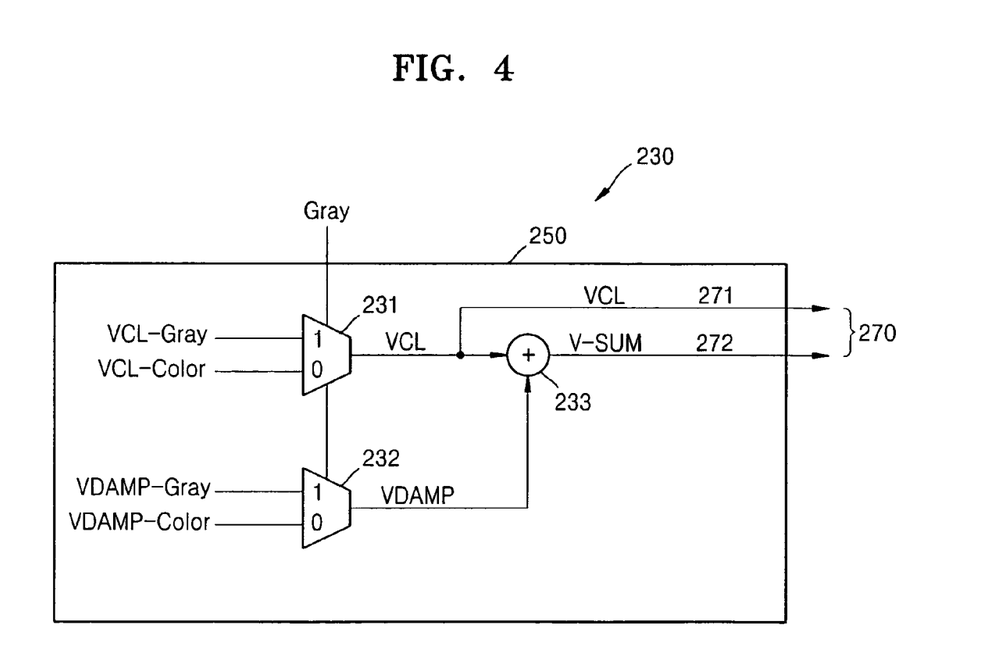
FIG. 4 is a block diagram of a reference value setting unit of FIG. 2.

FIG. 4 is a block diagram of the reference value setting unit 230 of FIG. 2.

Referring to FIG. 4, the reference value setting unit 230 includes a first output unit 231, a second output unit 232, and an adder 233.

The first output unit 231 outputs a first reference value VCL_Gray when the pattern detection signal 250 indicates the gray pattern and outputs a second reference value VCL_Color when the pattern detection signal 250 indicates the color pattern.

The second output unit 232 outputs a third reference value VDAMP_Gray when the pattern detection signal 250 indicates the gray pattern and outputs a fourth reference value VDAMP_Color when the pattern detection signal 250 indicates the color pattern.

Here, the first reference value VCL_Gray and the third reference value. VDAMP_Gray are reference values for compensating for the RGB image signal 240 in the RGB compensator 220 when the RGB image signal 240 is the gray pattern, and the second reference value VCL_Color and the fourth reference value VDAMP_Color are reference values for compensating for the RGB image signal 240 in the RGB compensator 220 when the RGB image signal 240 is the color pattern. In the present embodiment, since an amount of compensation in a case where the RGB image signal 240 is the gray pattern is greater than that in a case where the RGB image signal 240 is the color pattern, in general, the first reference value VCL_Gray is greater than the second reference value VCL_Color, and the third reference value VDAMP_Gray is greater than the fourth reference value VDAMP_Color.

The adder 233 adds an output value VCL of the first output unit 231 and an output value VDAMP of the second output unit 232.

The reference value setting unit 230 outputs one (VCL) 271 of the first reference value VCL_Gray and the second reference value VCL_Color, which is output from the first output unit 231, and one (V_SUM) 272 of a value obtained by adding the first reference value VCL_Gray to the third reference value VDAMP_Gray and a value obtained by adding the second reference value VCL_Color to the fourth reference value VDAMP_Color, which is output from the adder 233.

The reference value setting unit 230 outputs two reference values 271 and 272 since a compensating method and an amount of compensation vary based on results obtained by comparing the RGB difference value 260 output from the pattern detector 210 with the reference values 271 and 272.

If it is desired that color images are not compensated for at all, the second reference value VCL_Color and the fourth reference value VDAMP_Color are set to 0.

An illustrative operation of the reference value setting unit 230 will now be described with reference to FIG. 4.

If it is assumed that the first reference value VCL_Gray is 3, the second reference value VCL_Color is 1, the third reference value VDAMP_Gray is 2, and the fourth reference value VDAMP_Color is 1, the reference value setting unit 230 outputs the VCL value of 3 and the V_SUM value of 5 when the pattern detection signal 250 indicates the gray pattern and outputs the VCL value of 1 and the V_SUM value of 2 when the pattern detection signal 250 indicates the color pattern.

Figure 5:
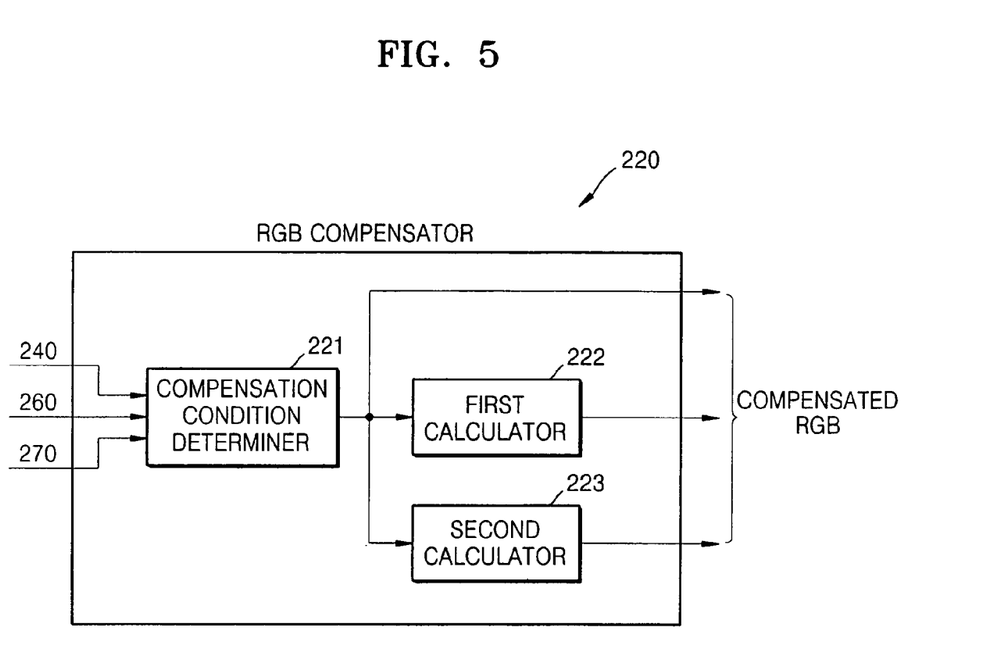
FIG. 5 is a block diagram of an RGB compensator of FIG. 2.

FIG. 5 is a block diagram of the RGB compensator 220 of FIG. 2.

Referring to FIG. 5, the RGB compensator 220 includes a compensation condition determiner 221, a first calculator 222, and a second calculator 223.

The compensation condition determiner 221 receives the RGB image signal 240 output from the ADC 11, the RGB difference value 260 output from the pattern detector 210, and the reference values (VCL and V_SUM) 270, and transmits the RGB image signal 240 to the first calculator 222 or the second calculator 223 based on predetermined conditions or transmits the RGB image signal 240 to the outside without compensation.

In the present embodiment, the compensation condition determiner 221 outputs the RGB image signal 240 to the first calculator 222 if the maximum difference value 260 is less than the reference value VCL. Also, the compensation condition determiner 221 outputs an R component of the RGB image signal 240 to the first calculator 222 if the RGB difference value 260 is greater than VCL and less than V_SUM and if a difference between an RGB median value and an R value is less than VCL. Also, the compensation condition determiner 221 outputs a G component of the RGB image signal 240 to the first calculator 222 if the RGB difference value 260 is greater than VCL and less than V_SUM and if a difference between an RGB median value and a G value is less than VCL. Also, the compensation condition determiner 221 outputs a B component of the RGB image signal 240 to the first calculator 222 if the RGB difference value 260 is greater than VCL and less than V_SUM and if a difference between an RGB median value and a B value is less than VCL. Also, the compensation condition determiner 221 outputs the R component of the RGB image signal 240 to the second calculator 223 if the RGB difference value 260 is greater than VCL and less than V_SUM and if the difference between the RGB median value and the R value is greater than VCL. Also, the compensation condition determiner 221 outputs the G component of the RGB image signal 240 to the second calculator 223 if the RGB difference value 260 is greater than VCL and less than V_SUM and if the difference between the RGB median value and the G value is greater than VCL. Also, the compensation condition determiner 221 outputs the B component of the RGB image signal 240 to the second calculator 223 if the RGB difference value 260 is greater than VCL and less than V_SUM and if the difference between the RGB median value and the B value is greater than VCL.

Also, the compensation condition determiner 221 outputs the RGB image signal 240 without compensation if the RGB difference value 260 is greater than V_SUM.

Table 1 illustrates determining conditions of the compensation condition determiner 221.

TABLE 1

| Output | RGB component | Condition |
|---|---|---|
| Output to the first calculator 222 | R | Maximum difference ≦ VCL, or VCL < RGB_difference ≦ V_SUM and \|Median − Rin\| < VCL |
| | G | Maximum difference ≦ VCL, or VCL < RGB_difference ≦ V_SUM and \|Median − Gin\| < VCL |
| | B | Maximum difference ≦ VCL, or (VCL < RGB_difference ≦ V_SUM and \|Median − Bin\| < VCL |
| Output to the second calculator 223 | R | VCL < RGB_difference ≦ V_SUM and \|Median − Rin\| ≧ VCL |
| | G | VCL < RGB_difference ≦ V_SUM and \|Median − Gin\| ≧ VCL |
| | B | VCL < RGB_difference ≦ V_SUM and \|Median − Bin\| ≧ VCL |
| No compensation | R | RGB_difference > V_SUM |
| | G | |
| | B | |

Here, Rin, Gin, and Bin are R, G, and B components of the input RGB image signal 240, respectively, Median is a median value of the R, G, and B values of the input RGB image signal 240, and RGB_difference is the RGB difference value 260.

The first calculator 222 compensates for the image signal 240 into the gray component using the median value Median of the RGB values. That is, the first calculator 222 substitutes R, G, and B components of the input RGB image signal 240 by Median.

The second calculator 223 compensates for the image signal 240 a little bit using approximate median values of the RGB values. For example, the second calculator 223 substitutes the R, G, and B components of the input RGB image signal 240 by $R_{out}=R_{in}-\{(R_{in}-Median)*|R_{in}-Median|\}/(VCL+VDAMP)$, $G_{out}=G_{in}-\{(G_{in}-Median)*|G_{in}-Median|\}/(VCL+VDAMP)$, and $B_{out}=B_{in}-\{(B_{in}-Median)*|B_{in}-Median|\}/(VCL+VDAMP)$, respectively. Here, $R_{out}$, $G_{out}$, $B_{out}$ are substituted RGB values, $R_{in}$, $G_{in}$, $B_{in}$ are the RGB values of the input RGB image signal 240, Median is a median value of the $R_{in}$, $G_{in}$, $B_{in}$ values, VCL+VDAMP denotes V_SUM 272 output from the adder 233.

Figure 6:
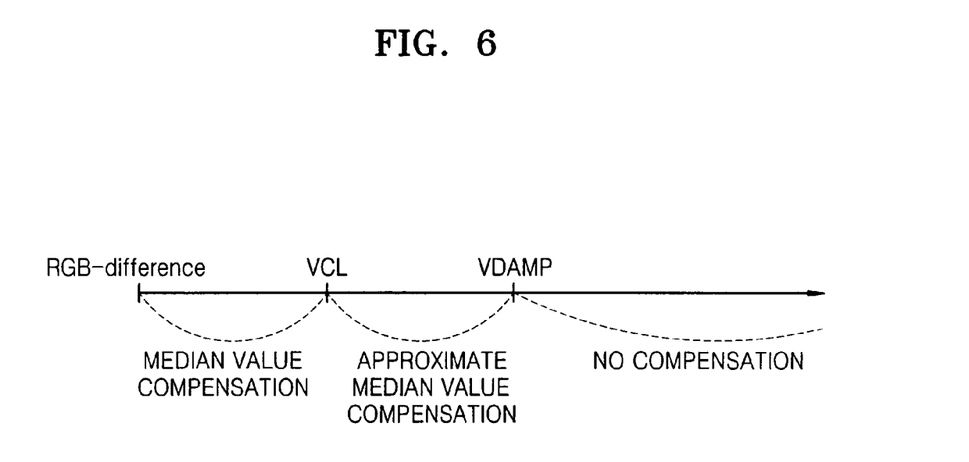
FIG. 6 is a diagram illustrating a function of the RGB compensator of FIG. 5.

FIG. 6 is a diagram illustrating a function of the RGB compensator 220 of FIG. 5.

Referring to FIG. 6, the RGB compensator 220 compensates for the RGB values of the input RGB image signal 240 into the median value of the RGB values if RGB_difference 260 is less than VCL, compensates for the RGB values of the input RGB image signal 240 into the approximate median values of the RGB values if RGB_difference 260 is greater than VCL and less than V_SUM, and does not compensate for the RGB values of the input RGB image signal 240 if RGB_difference 260 is greater than V_SUM.

An illustrative operation of the RGB compensator 220 will now be described with reference to FIG. 5.

If it is assumed that the RGB values of the input RGB image signal 240 are 101, 100, and 99, respectively, the first reference value VCL_Gray is 3, and the third reference value VDAMP_Gray is 2, since a maximum difference value is less than 3, all of compensated RGB values are substituted by the median value, i.e., 100.

If it is assumed that the RGB values of the input RGB image signal 240 are 102, 100, and 98, respectively, the first reference value VCL_Gray is 3, and the third reference value VDAMP_Gray is 2, a maximum difference value, i.e., 4, is greater than VCL and less than V_SUM, i.e., 5. Also, since all of the differences between the RGB median value, i.e., 100, and R, G, and B component values are less than VCL, the second calculator 223 compensates for the RGB values of the input RGB image signal 240 using approximate median values.

That is, $R_{out}$ is substituted by $102-\{(102-100)*|(102-100)|\}/(3+2)=101.2$, $G_{out}$ is substituted by $100-\{(100-100)*|(100-100)|\}/(3+2)=100$, $B_{out}$ is substituted by $98-\{(98-100)*|(98-100)|\}/(3+2)=98.8$.

If it is assumed that the RGB values of the input RGB image signal 240 are 103, 100, and 97, respectively, the first reference value VCL_Gray is 3, and the third reference value VDAMP_Gray is 2, since a maximum difference value, i.e., 6, is greater than V_SUM, i.e., 5, the input RGB image signal 240 is output without compensation.

As described above, according to a gray component compensation apparatus according to embodiments of the present invention, a problem of displaying a color component due to distortion of a gray component of an input image signal can be solved by resolving a color recognition problem of a gray signal generated by channel differences of the input image signal due to noise induced by a display system receiving a signal output from an ADC or external influences.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. An apparatus for detecting a color tone pattern of an input image signal, the apparatus comprising:

a pattern detector outputting a pattern detection signal by comparing a difference between image signal values of each of one or more pixels with a predetermined comparison value in an activated area of one frame of the input image signal or a predetermined area of the activated area, wherein if a maximum difference between image signal values of each pixel is less than the predetermined comparison value, the pattern detector outputs a pattern detection signal indicating that the image signal is a gray pattern, and if the maximum difference between the image signal values of each pixel is greater than the predetermined comparison value, the pattern detector outputs a pattern detection signal indicating that the image signal is a color pattern, wherein the pattern detector comprises:

a first color tone pattern detector outputting a first pattern detection signal by comparing a difference between image signal values of each pixel with a first predetermined comparison value in the activated area of one frame of the input image signal or the predetermined area of the activated area;

a second color tone pattern detector outputting a second pattern detection signal by comparing a difference between image signal values of a first pixel and image signal values of a second pixel neighboring the first pixel with a second predetermined comparison value in the activated area of the frame of the input image signal or the predetermined area of the activated area; and a third color tone pattern detector receiving the first and second pattern detection signals and performing an AND operation on the two pattern detection signals, wherein the first color tone pattern detector outputs the first pattern detection signal indicating that the image signal is a gray pattern if a maximum difference between the image signal values of each pixel is less than the first predetermined comparison value and outputs the first pattern detection signal indicating that the image signal is a color pattern if the maximum difference between the image signal values of each pixel is greater than the first predetermined comparison value, the second color tone pattern detector outputs the second pattern detection signal indicating that the image signal is the gray pattern if a maximum difference between the image signal values of the neighboring pixels is less than the second predetermined comparison value and outputs the second pattern detection signal indicating that the image signal is the color pattern if the maximum difference between the image signal values of the neighboring pixels is greater than the second predetermined comparison value, and the third color tone pattern detector outputs a third pattern detection signal indicating that the image signal is the gray pattern if the first and second pattern detection signals indicating that the image signal is the gray pattern are input from the first and second color tone pattern detectors and outputs the third pattern detection signal indicating that the image signal is the color pattern if the first or second pattern detection signal indicating that the image signal is the color pattern is input from the first or second color tone pattern detectors.

2. An apparatus for compensating for a gray component of an input image signal, the apparatus comprising:

a color tone pattern detector comparing a difference between image signal values of each of one or more pixels with a predetermined comparison value in an activated area of one frame of the input image signal or a predetermined area of the activated area and outputting the difference value and a pattern detection signal; and an RGB compensator compensating for the gray component of the input image signal in response to the pattern detection signal output from the color tone pattern detector, wherein the color tone pattern detector comprises:

a first color tone pattern detector outputting a first pattern detection signal by comparing a difference between image signal values of each pixel with a first predetermined comparison value in the activated area of one frame of the input image signal or the predetermined area of the activated area;

a second color tone pattern detector outputting a second pattern detection signal by comparing a difference between image signal values of a first pixel and image signal values of a second pixel neighboring the first pixel with a second predetermined comparison value in the activated area of the frame of the input image signal or the predetermined area of the activated area; and a third color tone pattern detector receiving the first and second pattern detection signals and performing an AND operation on the two pattern detection signals, wherein the first color tone pattern detector outputs the first pattern detection signal indicating that the image signal is a gray pattern if a maximum difference between the image signal values of each pixel is less than the first predetermined comparison value and outputs the first pattern detection signal indicating that the image signal is a color pattern if the maximum difference between the image signal values of each pixel is greater than the first predetermined comparison value, the second color tone pattern detector outputs the second pattern detection signal indicating that the image signal is the gray pattern if a maximum difference between the image signal values of the neighboring pixels is less than the second predetermined comparison value and outputs the second pattern detection signal indicating that the image signal is the color pattern if the maximum difference between the image signal values of the neighboring pixels is greater than the second predetermined comparison value, and the third color tone pattern detector outputs a third pattern detection signal indicating that the image signal is the gray pattern if the first and second pattern detection signals indicating that the image signal is the gray pattern are input from the first and second color tone pattern detectors and outputs the third pattern detection signal indicating that the image signal is the color pattern if the first or second pattern detection signal indicating that the image signal is the color pattern is input from the first or second color tone pattern detectors.

3. The apparatus of claim 2, wherein the pattern detector outputs a pattern detection signal indicating that the image signal is the gray pattern if a maximum difference between image signal values of each pixel is less than the predetermined comparison value and outputs a pattern detection signal indicating that the image signal is a color pattern if the maximum difference between the image signal values of each pixel is greater than the predetermined comparison value, and the RGB compensator adaptively compensates for the input image signal based on the difference value according to a color tone pattern of the input image signal.

4. The apparatus of claim 3, further comprising a reference value setting unit comprising:

a first output unit outputting a first reference value when the third pattern detection signal indicates the gray pattern and outputting a second reference value when the third pattern detection signal indicates the color pattern;

a second output unit outputting a third reference value when the third pattern detection signal indicates the gray pattern and outputting a fourth reference value when the third pattern detection signal indicates the color pattern; and an adder adding an output value of the first output unit to an output value of the second output unit.

5. The apparatus of claim 4, further comprising an image signal transformer transforming a format of the input image signal and outputting the transformed image signal to the first and second color tone pattern detectors, wherein the input image signal is one of RGB, YCbCr, and YPbPr image signals, and the image signal transformed by the image signal transformer is an RGB image signal.

6. The apparatus of claim 5, wherein the first color tone pattern detector obtains R−G, G−B, and B−R difference values using R, G, and B values of each pixel, and if all absolute values of the R-G, G-B, and B-R difference values are less than the predetermined comparison value, the first color tone pattern detector outputs the first pattern detection signal indicating that the image signal is the gray pattern, wherein the R, G and B are red, green and blue color component images of the image signal, respectively.

7. The apparatus of claim 6, wherein the second color tone pattern detector obtains absolute values of $(R_n-G_n)-(R_{n+1}-G_{n+1})$, $(G_n-B_n)-(G_{n+1}-B_{n+1})$, and $(B_n-R_n)-(B_{n+1}-R_{n+1})$ difference values using $R_n$, $G_n$, $B_n$, $R_{n+1}$, $G_{n+1}$, and $B_{n+1}$ values of neighboring pixels, and if all of the obtained absolute values are less than the predetermined comparison value, the second color tone pattern detector outputs the second pattern detection signal indicating that the image signal is the gray pattern, wherein the $R_n$, $G_n$, and $B_n$ values are RGB values of a certain pixel, and the $R_{n+1}$, $G_{n+1}$, and $B_{1+1}$ values are RGB values of a neighboring pixel of the certain pixel.

8. The apparatus of claim 7, wherein the RGB compensator: (i) compensates for the image signal into the gray component using a median value of the RGB values if the difference between the RGB values of the image signal is less than an output value of the first output unit, (ii) compensates for the image signal using approximate median values of the RGB values if the difference between the RGB values of the image signal is greater than the output value of the first output unit and less than an output value of the adder, and (iii) does not compensate for a tone color of the image signal if the difference of the RGB values of the image signal is greater than the output value of the adder.

9. The apparatus of claim 7, wherein the RGB compensator: (i) substitutes the RGB values of the image signal by a median value if a maximum difference between the RGB values of the image signal is less than an output value of the first output unit, (ii) substitutes an R component of the RGB image signal by the median value if the difference between the RGB values of the image signal is greater than the output value of the first output unit and less than an output value of the adder and if a difference between the median value of the RGB values and the R component value is less than the output value of the first output unit, (iii) substitutes a G component of the RGB image signal by the median value if the difference between the RGB values of the image signal is greater than the output value of the first output unit and less than the output value of the adder and if a difference between the median value of the RGB values and the G component value is less than the output value of the first output unit, (iv) substitutes a B component of the RGB image signal by the median value if the difference between the RGB values of the image signal is greater than the output value of the first output unit and less than the output value of the adder and if a difference between the median value of the RGB values and the B component value is less than the output value of the first output unit, (v) substitutes the R component of the RGB image signal by $R_{out}=R_{in}-\{(R_{in}-Median)*|R_{in}-Median|\}/(V\_SUM)$ if the difference between the RGB values of the image signal is greater than the output value of the first output unit and less than the output value of the adder and if the difference between the median value of the RGB values and the R component value is greater than the output value of the first output unit, (vi) substitutes the G component of the RGB image signal by $G_{out}=G_{in}-\{(G_{in}-Median)*|G_{in}-Median|\}/(V\_SUM)$ if the difference between the RGB values of the image signal is greater than the output value of the first output unit and less than the output value of the adder and if the difference between the median value of the RGB values and the G component value is greater than the output value of the first output unit, (vii) substitutes the B component of the RGB image signal by $B_{out}=B_{in}-\{(B_{in}-Median)*|B_{in}-Median|\}/(V\_SUM)$ if the difference between the RGB values of the image signal is greater than the output value of the first output unit and less than the output value of the adder and if the difference between the median value of the RGB values and the B component value is greater than the output value of the first output unit, wherein $R_{out}$, $G_{out}$, and $B_{out}$ are the substituted RGB values, $R_{in}$, $G_{in}$, and $B_{in}$ are the RGB values of the input image signal, Median denotes the median value of $R_{in}$, $G_{in}$, and $B_{in}$, and V_SUM denotes the output value of the adder, and (viii) does not compensate the color tone of the image signal if the difference between the RGB values of the image signal is greater than the output value of the adder.

10. An apparatus for detecting a color tone pattern of an input image signal, the apparatus comprising:

a first color tone pattern detector comparing a difference between image signal values of each of one or more pixels with a first predetermined comparison value in an activated area of one frame of the input image signal or a predetermined area of the activated area and outputting the difference value and a first pattern detection signal;

a second color tone pattern detector outputting a second pattern detection signal by comparing a difference between image signal values of neighboring pixels with a second predetermined comparison value in the activated area of the frame of the input image signal or the predetermined area of the activated area; and a third color tone pattern detector receiving the first and second pattern detection signals and performing an AND operation on the two pattern detection signals, wherein the first color tone pattern detector outputs the first pattern detection signal indicating that the image signal is a gray pattern if a maximum difference between the image signal values of each pixel is less than the first predetermined comparison value and outputs the first pattern detection signal indicating that the image signal is a color pattern if the maximum difference between the image signal values of each pixel is greater than the first predetermined comparison value, the second color tone pattern detector outputs the second pattern detection signal indicating that the image signal is the gray pattern if a maximum difference between the image signal values of the neighboring pixels is less than the second predetermined comparison value and outputs the second pattern detection signal indicating that the image signal is the color pattern if the maximum difference between the image signal values of the neighboring pixels is greater than the second predetermined comparison value, and the third color tone pattern detector outputs a third pattern detection signal indicating that the image signal is the gray pattern if the first and second pattern detection signals indicating that the image signal is the gray pattern are input from the first and second color tone pattern detectors and outputs the third pattern detection signal indicating that the image signal is the color pattern if the first or second pattern detection signal indicating that the image signal is the color pattern is input from the first or second color tone pattern detectors.

11. The apparatus of claim 10, wherein the image signal is an RGB image signal.

12. The apparatus of claim 10, further comprising an image signal transformer transforming a format of the input image signal and outputting the transformed image signal to the first and second color tone pattern detectors, wherein the input image signal is one of RGB, YCbCr, and YPbPr image signals, and the image signal transformed by the image signal transformer is an RGB image signal.

13. The apparatus of claim 10, wherein the first color tone pattern detector obtains R–G, G–B, and B–R difference values using R, G, and B values of each pixel, and if all absolute values of the R–G, G–B, and B–R difference values are less than the predetermined comparison value, the first color tone pattern detector outputs the first pattern detection signal indicating that the image signal is the gray pattern, wherein the R, G and B are red, green and blue color component images of the image signal, respectively.

14. The apparatus of claim 10, wherein the second color tone pattern detector obtains absolute values of $(R_n-G_n)-(R_{n+1}-G_{n+1})$, $(G_n-B_n)-(G_{n+1}-B_{n+1})$, and $(B_n-R_n)-(B_{n+1}-R_{n+1})$ difference values using $R_n$, $G_n$, $B_n$, $R_{n+1}$, $G_{n+1}$, and $B_{n+1}$ values of neighboring pixels, and if all of the obtained absolute values are less than the predetermined comparison value, the second color tone pattern detector outputs the second pattern detection signal indicating that the image signal is the gray pattern, wherein the $R_n$, $G_n$, and $B_n$ values are RGB values of a certain pixel, and the $R_{n+1}$, $G_{n+1}$, and $B_{n+1}$ values are RGB values of a neighboring pixel of the certain pixel.

15. An apparatus for compensating for a gray component of an input image signal, the apparatus comprising:

a first color tone pattern detector comparing a difference between image signal values of each of one or more pixels with a first predetermined comparison value in an activated area of one frame of the input image signal or a predetermined area of the activated area and outputting the difference value and a first pattern detection signal;

a second color tone pattern detector outputting a second pattern detection signal by comparing a difference between image signal values of neighboring pixels with a second predetermined comparison value in the activated area of the frame of the input image signal or the predetermined area of the activated area;

a third color tone pattern detector receiving the first and second pattern detection signals and performing an AND operation on the two pattern detection signals; and an RGB compensator compensating for the gray component of the input image signal in response to an output signal from the third color tone pattern detector, wherein the first color tone pattern detector outputs the first pattern detection signal indicating that the image signal is a gray pattern if a maximum difference between the image signal values of each pixel is less than the first predetermined comparison value and outputs the first pattern detection signal indicating that the image signal is a color pattern if the maximum difference between the image signal values of each pixel is greater than the first predetermined comparison value, the second color tone pattern detector outputs the second pattern detection signal indicating that the image signal is the gray pattern if a maximum difference between the image signal values of the neighboring pixels is less than the second predetermined comparison value and outputs the second pattern detection signal indicating that the image signal is the color pattern if the maximum difference between the image signal values of the neighboring pixels is greater than the second predetermined comparison value, the third color tone pattern detector outputs a third pattern detection signal indicating that the image signal is the gray pattern if the first and second pattern detection signals indicating that the image signal is the gray pattern are input from the first and second color tone pattern detectors and outputs the third pattern detection signal indicating that the image signal is the color pattern if the first or second pattern detection signal indicating that the image signal is the color pattern is input from the first or second color tone pattern detectors, and the RGB compensator adaptively compensates for the input image signal based on the difference value according to color tone pattern of the input image signal.

16. The apparatus of claim 15, further comprising a reference value setting unit comprising:

a first output unit outputting a first reference value when the third pattern detection signal indicates the gray pattern and outputting a second reference value when the third pattern detection signal indicates the color pattern;

a second output unit outputting a third reference value when the third pattern detection signal indicates the gray pattern and outputting a fourth reference value when the third pattern detection signal indicates the color pattern; and an adder adding an output value of the first output unit to an output value of the second output unit.

17. The apparatus of claim 16, wherein the image signal is an RGB image signal.

18. The apparatus of claim 16, further comprising an image signal transformer transforming a format of the input image signal and outputting the transformed image signal to the first and second color tone pattern detectors, wherein the input image signal is one of RGB, YCbCr, and YPbPr image signals, and the image signal transformed by the image signal transformer is an RGB image signal.

19. The apparatus of claim 18, wherein the first color tone pattern detector obtains R–G, G–B, and B–R difference values using R, G, and B values of each pixel, and if all absolute values of the R–G, G–B, and B–R difference values are less than the predetermined comparison value, the first color tone pattern detector outputs the first pattern detection signal indicating that the image signal is the gray pattern, wherein the R, G and B are red, green and blue color component images of the image signal, respectively.

20. The apparatus of claim 19, wherein the second color tone pattern detector obtains absolute values of $(R_n-G_n)-(R_{n+1}-G_{n+1})$, $(G_n-B_n)-(G_{n+1}-B_{n+1})$, and $(B_n-R_n)-(B_{n+1}-R_{n+1})$ difference values using $R_n$, $G_n$, $B_n$, $R_{n+1}$, $G_{n+1}$, and $B_{n+1}$ values of neighboring pixels, and if all of the obtained absolute values are less than the predetermined comparison value, the second color tone pattern detector outputs the second pattern detection signal indicating that the image signal is the gray pattern, wherein the $R_n$, $G_n$, and $B_n$ values are RGB values of a certain pixel, and the $R_{n+1}$, $G_{n+1}$, and $B_{n+1}$ values are RGB values of a neighboring pixel of the certain pixel.

21. The apparatus of claim 20, wherein the RGB compensator: (i) compensates for the image signal into the gray component using a median value of the RGB values if the difference between the RGB values of the image signal is less than an output value of the first output unit, (ii) compensates for the image signal using approximate median values of the RGB values if the difference between the RGB values of the image signal is greater than the output value of the first output unit and less than an output value of the adder, and (iii) does not compensate for a tone color of the image signal if the difference of the RGB values of the image signal is greater than the output value of the adder.

22. The apparatus of claim 20, wherein the RGB compensator: (i) substitutes the RGB values of the image signal by a median value if a maximum difference between the RGB values of the image signal is less than an output value of the first output unit, (ii) substitutes an R component of the RGB image signal by the median value if the difference between the RGB values of the image signal is greater than the output value of the first output unit and less than an output value of the adder and if a difference between the median value of the RGB values and the R component value is less than the output value of the first output unit, (iii) substitutes a G component of the RGB image signal by the median value if the difference between the RGB values of the image signal is greater than the output value of the first output unit and less than the output value of the adder and if a difference between the median value of the RGB values and the G component value is less than the output value of the first output unit, (iv) substitutes a B component of the RGB image signal by the median value if the difference between the RGB values of the image signal is greater than the output value of the first output unit and less than the output value of the adder and if a difference between the median value of the RGB values and the B component value is less than the output value of the first output unit, (v) substitutes the R component of the RGB image signal by $R_{out}=R_{in}-\{(R_{in}-Median)*|R_{in}-Median|\}/(V\_SUM)$ if the difference between the RGB values of the image signal is greater than the output value of the first output unit and less than the output value of the adder and if the difference between the median value of the RGB values and the R component value is greater than the output value of the first output unit, (vi) substitutes the G component of the RGB image signal by $G_{out}=G_{in}-\{(G_{in}-Median)*|G_{in}-Median|\}/(V\_SUM)$ if the difference between the RGB values of the image signal is greater than the output value of the first output unit and less than the output value of the adder and if the difference between the median value of the RGB values and the G component value is greater than the output value of the first output unit, (vii) substitutes the B component of the RGB image signal by $B_{out}=B_{in}-\{(B_{in}-Median)*|B_{in}-Median|\}/(V\_SUM)$ if the difference between the RGB values of the image signal is greater than the output value of the first output unit and less than the output value of the adder and if the difference between the median value of the RGB values and the B component value is greater than the output value of the first output unit, wherein $R_{out}$, $G_{out}$, and $B_{out}$ are the substituted RGB values, $R_{in}$, $G_{in}$, and $B_{in}$ are the RGB values of the input image signal, Median denotes the median value of $R_{in}$, $G_{in}$, and $B_{in}$, and V_SUM denotes the output value of the adder, and (viii) does not compensate for the color tone of the image signal if the difference between the RGB values of the image signal is greater than the output value of the adder.

23. The apparatus of claim 16, wherein the first reference value is greater than the second reference value, and the third reference value is greater than the fourth reference value.

24. An apparatus for compensating for a gray component of an input image signal, the apparatus comprising:
   a first color tone pattern detector comparing a difference between image signal values of each of one or more pixels with a first predetermined comparison value in an activated area of one frame of the input image signal or a predetermined area of the activated area and outputting the difference value and a first pattern detection signal;
   a second color tone pattern detector outputting a second pattern detection signal by comparing a difference between image signal values of neighboring pixels with second predetermined comparison value in the activated area of the frame of the input image signal or the predetermined area of the activated area;
   a third color tone pattern detector receiving the first and second pattern detection signals and performing an AND operation on the two pattern detection signals; and
   an RGB compensator compensating for the gray component of the input image signal in response to an output signal from the third color tone pattern detector,
   wherein the first color tone pattern detector outputs the first pattern detection signal indicating that the image signal is a gray pattern if a maximum difference between the image signal values of each pixel is less than the first predetermined comparison value and outputs the first pattern detection signal indicating that the image signal is a color pattern if the maximum difference between the image signal values of each pixel is greater than the first predetermined comparison value,
   the second color tone pattern detector outputs the second pattern detection signal indicating that the image signal is the gray pattern if a maximum difference between the image signal values of the neighboring pixels is less than the second predetermined comparison value and outputs the second pattern detection signal indicating that the image signal is the color pattern if the maximum difference between the image signal values of the neighboring pixels is greater than the second predetermined comparison value,
   the third color tone pattern detector outputs a third pattern detection signal indicating that the image signal is the gray pattern if the first and second pattern detection signals indicating that the image signal is the gray pattern are input from the first and second color tone pattern detectors and outputs the third pattern detection signal indicating that the image signal is the color pattern if the first or second pattern detection signal indicating that the image signal is the color pattern is input from the first or second color tone pattern detectors, and
   the RGB compensator does not compensate for a color tone if it is determined that the input image signal is the color pattern, compensates for the color tone based on the difference value if it is determined that the input image signal is the gray pattern, and compensates for the image signal into the gray component based on the difference value if it is determined that the input image signal is the gray pattern.

25. The apparatus of claim 24, further comprising a reference value setting unit comprising:
   a first output unit outputting a first reference value when the third pattern detection signal indicates the gray pattern and outputting a second reference value when the third pattern detection signal indicates the color pattern;
   a second output unit outputting a third reference value when the third pattern detection signal indicates the gray pattern and outputting a fourth reference value when the third pattern detection signal indicates the color pattern; and
   an adder adding an output value of the first output unit to an output value of the second output unit.

26. The apparatus of claim 25, wherein the first reference value is greater than the second reference value, and the third reference value is greater than the fourth reference value.

27. The apparatus of claim 24, wherein the first color tone pattern detector obtains R−G, G−B, and B−R difference values using R, G, and B values of each pixel, and if all absolute values of the R−G, G−B, and B−R difference values are less than the predetermined comparison value, the first color tone pattern detector outputs the first pattern detection signal indicating that the image signal is the gray pattern
   the second color tone pattern detector obtains absolute values of $(R_n-G_n)-(R_{n+1}-G_{n+1})$, $(G_n-B_n)-(G_{n+1}-B_{n+1})$, and $(B_n-R_n)-(B_{n+1}-R_{n+1})$ difference values using $R_n$, $G_n$, $B_n$, $R_{n+1}$, $G_{n+1}$, and $B_{n+1}$ values of neighboring pixels, and if all of the obtained absolute values are less than the predetermined comparison value, the second color tone pattern detector outputs the second pattern detection signal indicating that the image signal is the gray pattern, wherein the $R_n$, $G_n$, and $B_n$ values are RGB values of a certain pixel, and the $R_{n+1}$, $G_{n+1}$, and $B_{n+1}$ values are RGB values of a neighboring pixel of the certain pixel, wherein the R, G and B are red, green and blue color component images of the image signal, respectively.

28. The apparatus of claim 27, wherein the RGB compensator: (i) compensates for the image signal into the gray component using a median value of the RGB values if the difference between the RGB values of the image signal is less than an output value of the first output unit, (ii) compensates for the image signal using approximate median values of the RGB values if the difference between the RGB values of the image signal is greater than the output value of the first output unit and less than an output value of the adder, and (iii) does not compensate for a tone color of the image signal if the difference of the RGB values of the image signal is greater than the output value of the adder.

29. The apparatus of claim 27, wherein the RGB compensator: (i) substitutes the RGB values of the image signal by a median value if a maximum difference between the RGB values of the image signal is less than an output value of the first output unit, (ii) substitutes an R component of the RGB image signal by the median value if the difference between the RGB values of the image signal is greater than the output value of the first output unit and less than an output value of the adder and if a difference between the median value of the RGB values and the R component value is less than the output value of the first output unit, (iii) substitutes a G component of the RGB image signal by the median value if the difference between the RGB values of the image signal is greater than the output value of the first output unit and less than the output value of the adder and if a difference between the median value of the RGB values and the G component value is less than the output value of the first output unit, (iv) substitutes a B component of the RGB image signal by the median value if the difference between the RGB values of the image signal is greater than the output value of the first output unit and less than the output value of the adder and if a difference between the median value of the RGB values and the B component value is less than the output value of the first output unit, (v) substitutes the R component of the RGB image signal by $R_{out}=R_{in}-\{(R_{in}-Median)*|R_{in}-Median|\}/(V\_SUM)$ if the difference between the RGB values of the image signal is greater than the output value of the first output unit and less than the output value of the adder and if the difference between the median value of the RGB values and the R component value is greater than the output value of the first output unit, (vi) substitutes the G component of the RGB image signal by $G_{out}=G_{in}-\{(G_{in}-Median)*|G_n-Median|\}/(V\_SUM)$ if the difference between the RGB values of the image signal is greater than the output value of the first output unit and less than the output value of the adder and if the difference between the median value of the RGB values and the G component value is greater than the output value of the first output unit, (vii) substitutes the B component of the RGB image signal by $B_{out}=B_{in}-\{(B_{in}-Median)*|B_{in}-Median|\}/(V\_SUM)$ if the difference between the RGB values of the image signal is greater than the output value of the first output unit and less than the output value of the adder and if the difference between the median value of the RGB values and the B component value is greater than the output value of the first output unit, wherein $R_{out}$, $G_{out}$, and $B_{out}$ are the substituted RGB values, $R_{in}$, $G_{in}$, and $B_{in}$ are the RGB values of the input image signal, Median denotes the median value of $R_{in}$, $G_{in}$, and $B_{in}$, and V_SUM denotes the output value of the adder, and (viii) does not compensate the color tone of the image signal if the difference between the RGB values of the image signal is greater than the output value of the adder.

* * * * *